United States Patent
Morbach et al.

(10) Patent No.: US 6,257,651 B1
(45) Date of Patent: Jul. 10, 2001

(54) HATCHBACK DOOR FOR A MOTOR VEHICLE

(75) Inventors: Nick Morbach, Aschaffenburg; Carsten Hofer, Gressestheim; Werner Schmidt, Alzenau; Matthias Kraus, Bad Homburg; Stephan Schutt, Goldbach, all of (DE)

(73) Assignee: Magna Europa AG, Oberswaltersdorf (AT)

( * ) Notice: Subject to any disclaimer, the term of this patent is extended or adjusted under 35 U.S.C. 154(b) by 0 days.

(21) Appl. No.: 09/645,214

(22) Filed: Aug. 24, 2000

(30) Foreign Application Priority Data

Aug. 24, 1999 (AU) .............................. GM/563-99

(51) Int. Cl.⁷ ................. B60J 5/12; B60J 1/18; E06B 7/86
(52) U.S. Cl. .............. 296/146.13; 296/50; 296/106; 296/147; 49/74.1; 160/202; 160/211
(58) Field of Search ............... 49/74.1; 160/202, 160/207, 211; 296/50, 55, 106, 146.8, 146.13, 147, 155

(56) References Cited

U.S. PATENT DOCUMENTS

| | | | |
|---|---|---|---|
| 1,379,412 | * | 5/1921 | Mertens ............... 160/182 |
| 1,405,485 | * | 2/1922 | Callery ............... 410/127 |
| 1,781,304 | * | 11/1930 | Shook ............... 49/64 |
| 1,840,026 | * | 1/1932 | Ernst ............... 49/87.1 |
| 2,203,934 | * | 6/1940 | Wiles ............... 49/74.1 |
| 2,827,118 | * | 3/1958 | Wendt ............... 160/184 |
| 3,538,975 | * | 11/1970 | Metti et al. ............... 160/1 |
| 4,165,118 | * | 8/1979 | Jensen ............... 296/50 |
| 4,379,585 | * | 4/1983 | Strick ............... 296/146.8 |
| 4,545,611 | * | 10/1985 | Broadbent ............... 296/181 |
| 4,799,727 | * | 1/1989 | Robbins et al. ............... 296/107.07 |
| 5,104,172 | * | 4/1992 | Schildt ............... 296/50 |
| 5,110,172 | * | 5/1992 | Ney et al. ............... 296/50 |
| 5,176,388 | * | 1/1993 | Horton ............... 296/155 |
| 5,282,663 | * | 2/1994 | Horton ............... 296/155 |
| 5,547,241 | * | 8/1996 | Villella et al. ............... 296/24.1 |
| 5,921,611 | * | 7/1999 | Townsend ............... 296/155 |
| 5,975,620 | * | 11/1999 | Jambor et al. ............... 296/108 |
| 6,053,554 | * | 4/2000 | Doniaz ............... 296/50 |
| 6,089,648 | * | 7/2000 | Schurig et al. ............... 296/146.8 |
| 6,148,895 | * | 11/2000 | Biggers ............... 160/183 |

FOREIGN PATENT DOCUMENTS 0 774 370 A2   5/1997  (EP) .
2553347     *  4/1985  (FR) ............... 296/146.13

* cited by examiner

Primary Examiner—Joseph D. Pape
Assistant Examiner—Paul Chenevert
(74) Attorney, Agent, or Firm—Clark Hill PLC

(57) ABSTRACT

The invention concerns a hatchback door (1) motor vehicle with hatchback door parts (5, 5') displaceably mounted in relation to the hatchback door. The hatchback door parts are lamellas (5, 5') which are rotatably mounted in relation to the hatch-back opening (3) and which can be pushed together into at least one lamella package in the open position.

8 Claims, 2 Drawing Sheets

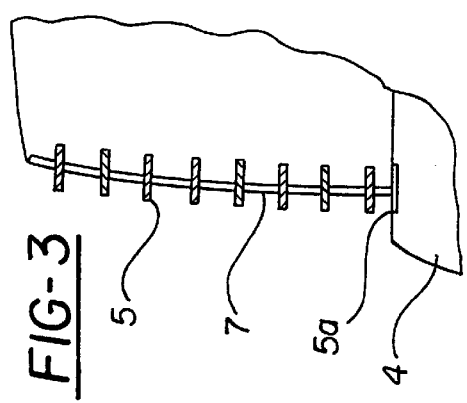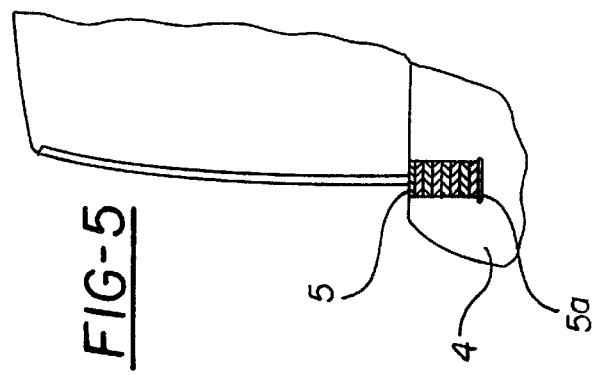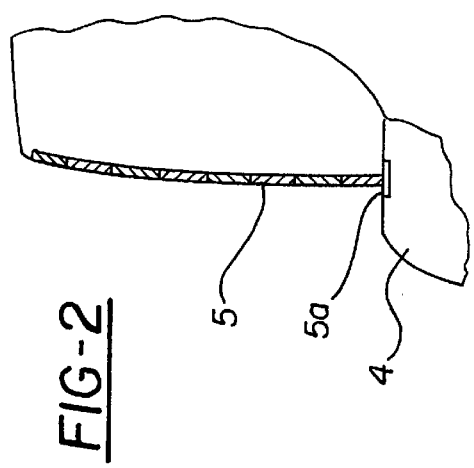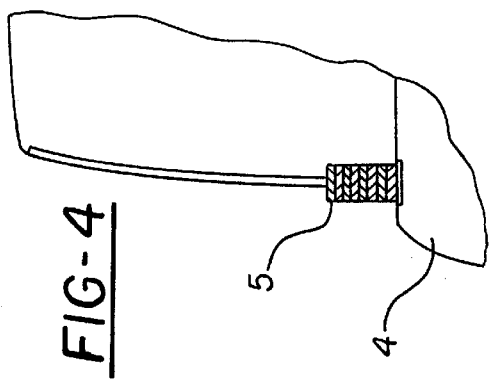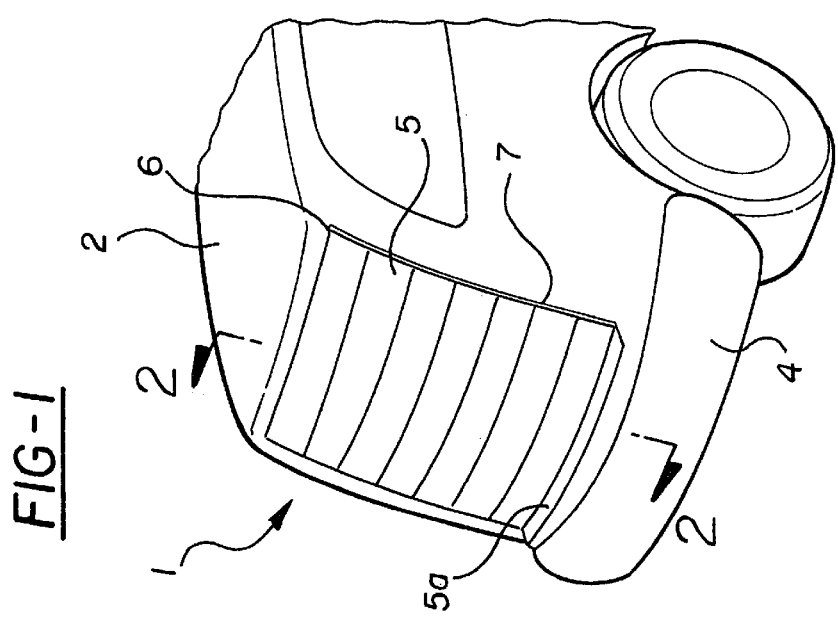

HATCHBACK DOOR FOR A MOTOR VEHICLE

Figure 7:
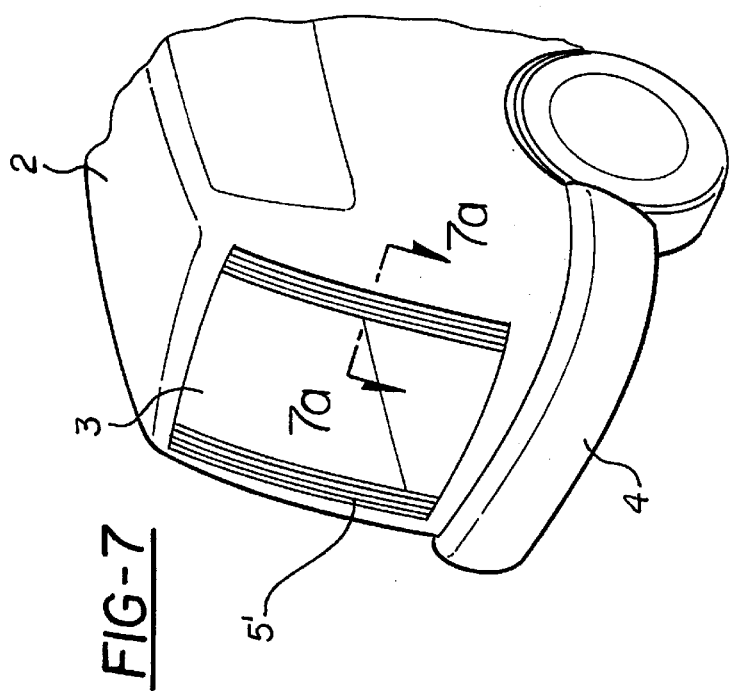

The invention concerns a hatchback door for a motor vehicle with hatchback door parts displaceably mounted in relation to the hatchback door.

Besides the common one-piece roof-mounted hatchback doors whose disadvantages are no doubt widely known, especially the necessary stepping-back for opening, the restricted standing height due to the limited opening angle, the problematic opening in tight parking spaces or in garages, there are also already known to be hatchback door constructions with two parts, some of which have also been produced. Such a solution permits, for example, a top and bottom hatchback door part which are respectively attached to the top and bottom of the hatchback opening and can be swivelled. However, the top and bottom hatchback doors can only be opened one after another, and usually two hands are necessary for opening.

Two-part hatchback door constructions are also known where the two hatchback door parts are laterally mounted on the hatchback opening and can be swivelled open and closed. In this case, both lid parts can also only be opened one after another and usage of the loading space in tight parking spaces is still uncomfortable. At an opening angle over 90° there is the further possibility of endangering other road-users. Also, the opening and closing is also problematic with wind load.

A hatchback lid for a motor vehicle is known from EP-A 0 774 370 which consists of a hatchback lid frame that can be swivelled from a closed to an open position. With this hatchback lid frame, at least one bottom sliding element (which can be pushed upwards) is held in a sliding track which makes it possible to open a bottom lid area while the hatchback lid frame is closed. This construction can also contain a top sliding element for opening a top lid area which is attached to the hatchback lid frame and can be moved downwards. This solution is supposed to create a simply constructed hatchback lid which enables a comfortable and easy access to the bottom trunk sill of the hatchback opening. However, with loading bigger objects it is still necessary to swivel the total hatchback door upwards in the usual manner in order to be able to use the complete hatchback opening for loading.

The purpose of this invention consists of producing a simply constructed hatchback door which requires almost no space for opening and closing, neither in a backwards nor upwards direction, thus no longer restricting the standing height. Furthermore, it should make a completely automatic opening and closing of the hatchback door possible.

The invention solves this task by having the hatchback door consist of lamellas which are rotatable in relation to the opening of the hatchback and which can be pushed together into at least one lamella package in the open position.

Thus, the required space for opening and closing such a hatchback door is reduced to a minimum according to this invention. The slidable and rotatable lamellas can be pushed together into a lamella package which requires hardly any or very little space. Besides this, the "lamella door" model according to the invention also enables a simple hatchback door construction and a fully automatic operation using corresponding mechanisms.

In a preferred construction design of the invention, the hatchback door lamellas are arranged in such a way that they are perpendicular to the hatchback opening and can be pushed together into a single lamella package at the bottom area of the hatchback opening (claim 2). This arrangement allows for a constructively simple and very useful hatchback door design.

The special advantage of this construction design is the possibility of concealing the lamella package into the rear bumper (claim 3). Thus, the complete hatchback opening is available for loading and unloading of the vehicle.

A very functional detail of this construction design provides the bottom lamella with a cover for the opening in the bumper into which the lamella package can be pushed. (claim 4).

Another construction design according to the invention allows the lamellas being arranged in a top to bottom direction in relation to the hatchback opening, more particularly for two lamella packages which can be pushed together at each of the respective outer- edge areas of the hatchback opening (claim 5). This variant is especially useful if it is not possible, due to constructional reasons, to either lower the lamella package into the bumper, or to assemble it in such a way so that the bottom loading edge is accessible without any obstacles.

Functionality in opening and closing is supported by the lamellas being successively rotatable at the pushing together into a lamella package (claim 6).

In order to put a "rear window" at disposal, the construction design according to the invention allows for transparent lamellas at the top area of the hatchback opening or as well just the relevant lamella areas (claim 7).

The slidable lamella arrangement can be constructed in a simple fashion, for instance, by supplying the narrow end faces of the lamellas with guide parts. By using these guide parts the lamellas can be slid along the coulisses located at the outer edges of the hatchback opening (claim 8).

Further characteristics, advantages and details of the invention will now be described in the drawing which contains schematic representations of various examples. In it, the figures describe FIG. 1 an oblique view of the rear area of a vehicle with closed hatchback door, FIG. 2 a longitudinal section through the hatchback door along the line II—II of FIG. 1, FIG. 3 a section through the hatchback door in an intermediate position at opening or closing, FIG. 4 also a section of the pushing together of the individual lamellas of the hatchback door in the process of opening, FIG. 5 a section of the lamella package lowered into the bumper with a completely opened hatchback opening, FIG. 6 and FIG. 6a as well as FIG. 7 and 7a the operating principle of a second construction design variant of the hatchback door according to the invention, FIG. 6 and FIG. 7 hatchback door viewed from above, FIG. 6 in an intermediate position at opening or closing, FIG. 7 in the opened position, FIG. 6a a section along the line VI—VI of FIG. 6 and FIG. 7a a section along the line VII—VII of FIG. 7.

In the drawing figures, 1 designates the hatchback door, 2 the car roof, 3 the hatchback opening and 4 the rear bumper.

As shown especially in FIG. 1 to FIG. 3, a hatchback door 1 constructed according to the invention is composed of a number of perpendicular lamellas 5, separate from each other, which create a surface when in a closed position. The lamellas 5 can be made, for instance, of plastic or metal which are preferably produced from injection-moulded parts. More particularly the top lamellas 5 are made of a transparent matrial. The lamellas 5 use laterally mounted guide parts 6 to clasp the respective coulisses 7 (indicated), which are provided at the lateral edges of the hatchback opening 3 (only schematically shown).

The individual lamellas 5 are vertically connected to each other via an appropriate suspension and operating system, not represented, which is preferably situated in the area of the coulisses 7. This especially allows for an electric operation of the lamellas 5 for opening and closing the hatchback opening.

As shown in FIG. 2, the bottom lamella 5a is positioned in such a way as to create a cover for the space into which the lamella package is lowered. The lamella package is comprised of the lamellas 5 which have been pushed together. FIG. 2 shows that the lowest of the lamellas 5 (which close the hatchback opening) rests with its end face against the lamella 5a.

For opening, the lamellas 5 are rotated 90° into a position perpendicular to the hatchback opening 3 via manual or, as already mentioned, electrically operated mechanisms, as shown in FIG. 3. As can be deduced from FIG. 4 and FIG. 5, the lamellas 5 are then pushed together into a lamella package which is then completely lowered into the bumper 4.

Figure 6:
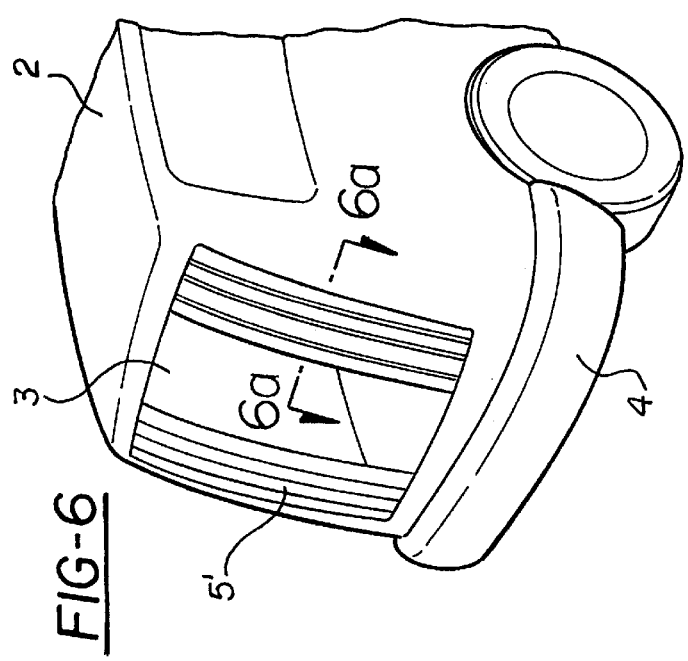
Figure 6A:
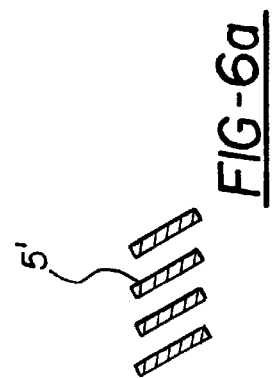

In addition to a horizontal arrangement of the lamellas 5, as intended in construction designs according to FIG. 1 to FIG. 5, there can also be a vertical arrangement of lamellas 5'. One such model is shown in FIG. 6 and 7. Here, the hatchback door 1 also consists of lamellas 5', separate from each other, which are now suspended or positioned and guided via the coulisses 7 in the top and bottom edge of the hatchback opening 3. Otherwise, the lamellas 5' can be arranged as in the above-mentioned first construction design.

Figure 7A:
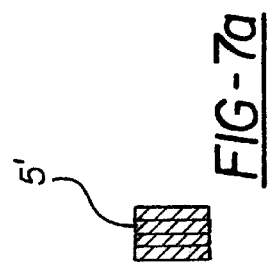

This example deviates from the first model design especially in that the lamellas 5' can be pushed together into two separate lamella packages via the intended suspension and operation mechanisms (not represented). This is rather advantageous for spatial reasons. For opening, the lamellas 5' are rotated successively and thus lined up and simultaneously moved to the right/left via the top and bottom coulisses 7'. FIG. 8a shows a section of an intermediate position of the created lamella package where the lamellas 5' are not yet rotated completely. FIG. 7 schematically represents a completely opened position, FIG. 7a shows one of the lamella packages composed of lamellas 5' pushed onto each other. In this model, it is especially intended to have the lamellas 5' in the top area to be made of a see-through or transparent material.

The invention is not restricted to the represented and described models. Above all, some of the measurements which are only described for one of the model variations can also be used for the other variations.

What is claimed is:

1. Hatchback door for a motor vehicle with hatchback door parts displaceably mounted in relation to the hatchback door, characterized by having the hatchback door including lamellas (5, 5') which are collectably rotatable in relation to the hatchback opening (3) and selectively collapsible into at least one lamella package in the open position.

2. Hatchback door according to claim 1, characterized by having the lamellas (5) arranged in such a way that they are perpendicular to the hatchback opening (3) and can be pushed together into a single lamella package at the bottom area of the hatchback opening (3).

3. Hatchback door according to claim 1 or 2, characterized by the possibility of concealing the lamella package into the rear bumper (4).

4. Hatchback door according to one of claims 1 to 3, characterized by providing the bottom lamella (5a) with a cover for the opening in the bumper (4) into which the lamella package can be pushed.

5. Hatchback door according to claim 1, characterized by the lamellas (5') being arranged in a top to bottom direction in relation to the hatchback opening (3), more particularly two lamella packages which can be pushed together at each of the respective lateral edge areas of the hatchback opening (3).

6. Hatchback door according to one of claims 1 to 5, characterized by the lamellas (5, 5') being successively rotatable at the pushing together into a lamella package.

7. Hatchback door according to one of claims 1 to 6, characterized by including transparent lamellas (5) adjacent the top area of the hatchback opening (3).

8. Hatchback door according to one of claims 1 to 7, characterized by supplying the narrow end faces of the lamellas (5, 5') with guide parts (6). By using these guide parts, the lamellas (5, 5') can be slid along the coulisses (7, 7') located at the outer edges of the hatchback opening (3).

* * * * *

UNITED STATES PATENT AND TRADEMARK OFFICE
CERTIFICATE OF CORRECTION

PATENT NO.    : 6,257,651 B1
DATED         : July 10, 2001
INVENTOR(S)   : Morbach et al.

It is certified that error appears in the above-identified patent and that said Letters Patent is hereby corrected as shown below:

<u>Title page,</u>
Item [75], Inventors, "Gressestheim" should be -- Kelsterbach --.
Inventors, "Schutt" should be -- Schuett --.

<u>Column 2,</u>
Line 64, "matrial" should be -- material --.

Signed and Sealed this

Thirtieth Day of July, 2002

Attest:

JAMES E. ROGAN
Attesting Officer          Director of the United States Patent and Trademark Office